United States Patent
Araya et al.

(10) Patent No.: US 8,668,176 B2
(45) Date of Patent: Mar. 11, 2014

(54) PART FIXING STRUCTURE TO RESIN-MADE FUEL TANK AND PART FIXING METHOD THERETO

(75) Inventors: Satoru Araya, Tochigi (JP); Kazuhiro Ohtaki, Tochigi (JP); Masahiro Niihori, Tochigi (JP); Wataru Iwase, Tochigi (JP)

(73) Assignee: Yachiyo Industry Co., Ltd., Sayama-Shi, Saitama (JP)

( * ) Notice: Subject to any disclaimer, the term of this patent is extended or adjusted under 35 U.S.C. 154(b) by 0 days.

(21) Appl. No.: 13/009,257

(22) Filed: Jan. 19, 2011

(65) Prior Publication Data

US 2011/0174946 A1    Jul. 21, 2011

(30) Foreign Application Priority Data

Jan. 19, 2010    (JP) .................................. 2010-009272

(51) Int. Cl.
*F16L 3/08*    (2006.01)
(52) U.S. Cl.
USPC .............. 248/225.21; 248/346.05; 248/229.1; 248/27.3; 29/521
(58) Field of Classification Search
USPC ........... 248/225.21, 346.05, 229.1, 371, 27.1, 248/27.3, 222.52, 425, 130, 223.31, 248/223.41; 29/48, 428, 521
See application file for complete search history.

(56) References Cited

U.S. PATENT DOCUMENTS

| | | | | |
|---|---|---|---|---|
| 2,705,346 A | * | 4/1955 | Schlabach et al. | 264/249 |
| 4,125,339 A | * | 11/1978 | Pittinger et al. | 403/348 |
| 4,323,411 A | * | 4/1982 | Uhlig | 156/245 |
| 4,342,799 A | * | 8/1982 | Schwochert | 428/35.7 |
| 4,891,000 A | * | 1/1990 | Ishii | 425/522 |
| 5,219,135 A | * | 6/1993 | Scott | 248/27.1 |

(Continued)

FOREIGN PATENT DOCUMENTS

| | | |
|---|---|---|
| CA | 2 641 463 A1 | 8/2007 |
| DE | 10 2006 006 469 A1 | 8/2007 |

(Continued)

OTHER PUBLICATIONS

International Search Report application No. 11151357.8 dated Mar. 21, 2011.

*Primary Examiner* — Terrell McKinnon
*Assistant Examiner* — Monica Millner
(74) *Attorney, Agent, or Firm* — Squire Sanders (US) LLP

(57) ABSTRACT

There are provided a part fixing structure and a part fixing method to a resin-made fuel tank which can firmly fix a part to a tank wall without the need of providing a molding die with a convex portion and a recess. A part fixing method for fixing a tank-associated part to a tank wall of a resin-made fuel tank, the part being formed together with a pair of hook portions, the method comprising a step of burying the hook portions in the tank wall in a melted state when the resin-made fuel tank is molded, thereby fixing the part to the tank wall after the tank wall is cooled. In order to cause the resin of the tank wall to flow well, a chevron portion having a pair of first inclined faces is projectingly provided at the bottom face of the part between the hook portions, and a second inclined face which is inclined in a direction opposite to the buried direction toward the tip of the hook portion is formed at the bottom face of each hook portion.

3 Claims, 5 Drawing Sheets

(56) References Cited

U.S. PATENT DOCUMENTS

| | | | |
|---|---|---|---|
| 5,308,427 A * | 5/1994 | Duhaime et al. | 156/245 |
| 5,326,514 A * | 7/1994 | Linden et al. | 264/83 |
| 5,445,783 A * | 8/1995 | Irish et al. | 264/515 |
| 5,909,008 A * | 6/1999 | Pelaez | 174/138 G |
| 6,103,170 A * | 8/2000 | Gregory | 264/268 |
| 6,446,913 B1 * | 9/2002 | Schroeder | 248/27.1 |
| 6,499,500 B2 * | 12/2002 | Rosseel | 137/15.17 |
| 6,527,892 B1 | 3/2003 | Gombert et al. | |
| 6,895,998 B2 * | 5/2005 | Aoki et al. | 137/592 |
| 7,059,305 B2 * | 6/2006 | Knaggs et al. | 123/509 |
| 7,063,113 B2 * | 6/2006 | Ropert et al. | 141/350 |
| 7,290,675 B2 * | 11/2007 | Gombert et al. | 220/562 |
| 7,695,656 B2 * | 4/2010 | Chen et al. | 264/68 |
| 7,748,397 B2 * | 7/2010 | Firtion et al. | 137/15.17 |
| 2002/0043533 A1 * | 4/2002 | Gombert et al. | 220/4.13 |
| 2003/0184091 A1 * | 10/2003 | Ricard | 285/358 |
| 2010/0162690 A1 * | 7/2010 | Hosaka et al. | 60/295 |
| 2010/0212806 A1 * | 8/2010 | Lemoine et al. | 156/92 |
| 2011/0127761 A1 * | 6/2011 | Yoshizawa et al. | 280/834 |
| 2011/0139342 A1 * | 6/2011 | Jannot et al. | 156/92 |

FOREIGN PATENT DOCUMENTS

| | | |
|---|---|---|
| EP | 1 099 529 A1 | 5/2001 |
| EP | 1 238 845 A2 | 9/2002 |
| JP | 2009-132297 A | 6/2009 |
| WO | 2006/008308 A1 | 1/2006 |

\* cited by examiner

PART FIXING STRUCTURE TO RESIN-MADE FUEL TANK AND PART FIXING METHOD THERETO

CROSS-REFERENCE TO RELATED APPLICATION

The present application claims benefit of the filing date of Japanese Patent Application No. 2010-009272 filed on Jan. 19, 2010 which is incorporated herein by reference.

BACKGROUND OF THE INVENTION

1. Field of the Invention

The present invention relates to a resin-made fuel tank for a vehicle, and more specifically, a part fixing structure and a part fixing method to such a resin-made fuel tank.

2. Description of the Related Art

Prior arts of fixing a tank-associated part to a resin-made fuel tank are disclosed in JP 2009-132297 A and JP 2008-507651 A. JP 2009-132297 A discloses a technique for forming a part so as to have an abutting face that closely contacts an internal face of a tank wall of a fuel tank and to have a protrusion protruding from the abutting face and having a triangular cross section. The protrusion is allowed to enter in the interior of the tank wall, thereby fixing the part to the tank wall. JP 2008-507651 A discloses a technique for forming a part so as to have an orifice, and a melted resin of a tank wall is caused to flow into a recess of a core (a counter molding part) through the orifice, thereby fixing the part to the tank wall with the flowed resin portion being as a rivet-like engaging portion.

According to JP 2009-132297 A, since the protrusion of the part has a triangular cross section which gradually tapers toward the tip, it is difficult to obtain mechanical coupling force to the tank wall. In contrast, according to JP 2008-507651 A, since the portion of the resin of the tank wall serves as the rivet-like engaging portion, the part is firmly fixed to the tank wall because of mechanical coupling force by the engaging portion.

According to JP 2008-507651 A, however, in order to allow the resin of the tank wall to efficiently flow into the orifice, it is necessary to provide, at a die side, a convex portion which protrudes into the orifice, and in order to form a rivet-like engaging portion, it is also necessary to form a recess at a core side. Therefore, there arises a problem that the configuration of the molding die for a fuel tank becomes complex.

Moreover, According to JP 2008-507651 A, since the total cubic volume of sheet-like parison layers (i.e., HDPE layers 2, 2', and an EVOH layer 3) are predetermined, when a resin is poured into the recess of the core in order to form a rivet-like portion (i.e., a plateau portion 8), the layer other than the rivet-like portion should be partially thin by what corresponds to the flowed resin. Hence, in the case of the structure disclosed in FIG. 1 of JP 2008-507651 A, for example, it is necessary in some cases to make the layer of a portion along the inclined face of the convex portion of the die to be thin. From the standpoint of the strength of the tank and of the fuel impermeable characteristic, it is not desirable that a thin layer is partially formed as described above.

The present invention has been made in view of the foregoing circumstances, and it is an object of the present invention to provide a part fixing structure and a part fixing method to a resin-made fuel tank which can firmly fix a part to a tank wall without the need of providing a convex portion and a recess on a molding die.

SUMMARY OF THE INVENTION

In order to achieve the above object, a first aspect of the present invention provides a part fixing structure which fixes a tank-associated part to a tank wall of a resin-made fuel tank, the part fixing structure comprising: a hook portion formed together with the part, wherein the hook portion is buried in the tank wall, thereby fixing the part to the tank wall.

According to the configuration of the first aspect of the present invention, since the part is provided with the hook portion which is buried in the tank wall, the part is thus fixed to the tank wall. Accordingly, it is not necessary to form the resin of the tank wall as a rivet-like engaging portion like JP 2008-507651 A, and the molding die for the fuel tank needs no convex portion or recess for fixing the part. Therefore, the shape of the molding die for the fuel tank can be simplified.

A second aspect of the present invention provides the part fixing structure of the first aspect of the present invention, in which at least a pair of hook portions is formed so that respective tips of the hook portions are opposed to each other at a distance.

According to the configuration of the second aspect of the present invention, fixing of the part to the tank wall becomes stable by the pair of hook portions, and a larger mechanical coupling force can be obtained.

A third aspect of the present invention provides the part fixing structure of the second aspect of the present invention, in which a chevron portion having a pair of first inclined faces is projectingly provided at a bottom face of the part between the pair of hook portions, and a second inclined face which is inclined in a direction opposite to a buried direction of the hook portion toward the tip of the hook portion is formed at a bottom face of each of the pair of hook portions.

According to the configuration of the third aspect of the present invention, individual first inclined faces of the chevron portion and individual second inclined faces formed at respective bottom faces of the hook portions work together as a guide face which positively guides the melted resin of the tank wall into the internal space between the hook portions, so that the resin smoothly flows into the internal space between the hook portion when the hook portion is buried in the tank wall.

A fourth aspect of the present invention provides a part fixing method for fixing a tank-associated part to a tank wall of a resin-made fuel tank, the part being formed together with a hook portion, the method comprising a step of: burying the hook portion in the tank wall in a melted state when the resin-made fuel tank is molded, thereby fixing the part to the tank wall after the tank wall is cooled.

A fifth aspect of the present invention provides the part fixing method of the fourth aspect of the present invention, in which at least a pair of hook portions is formed so that respective tips of the hook portions are opposed to each other at a distance, and the method further comprising a step of causing a resin of the tank wall in the melted state to flow into a space surrounded by the hook portions when the resin-made fuel tank is molded.

A sixth aspect of the present invention provides the part fixing method of the fifth aspect of the present invention, in which a chevron portion having a pair of first inclined faces is projectingly provided at a bottom face of the part between the pair of hook portions, and a second inclined face which is inclined in a direction opposite to a buried direction of the hook portion toward the tip of the hook portion is formed at a bottom face of each of the pair of hook portions.

DETAILED DESCRIPTION OF THE PREFERRED EMBODIMENTS

Figure 1A:
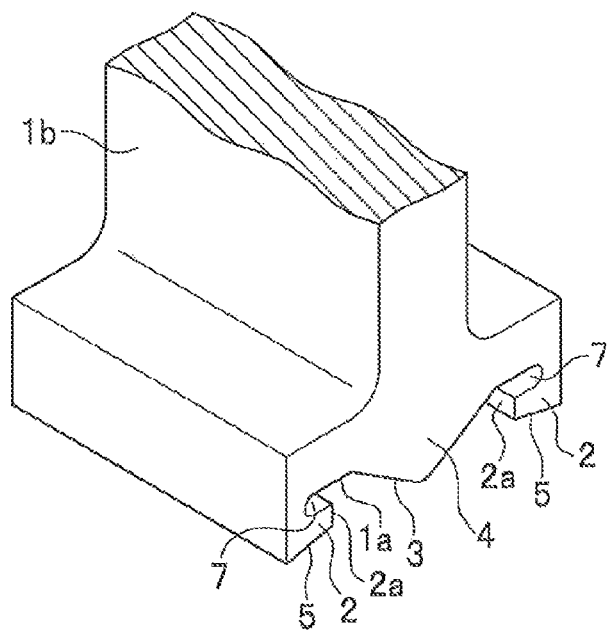
FIG. 1A is a diagram for explaining a hook portion according to the present invention, and is a perspective view showing an outline of the hook portion.
Figure 1B:
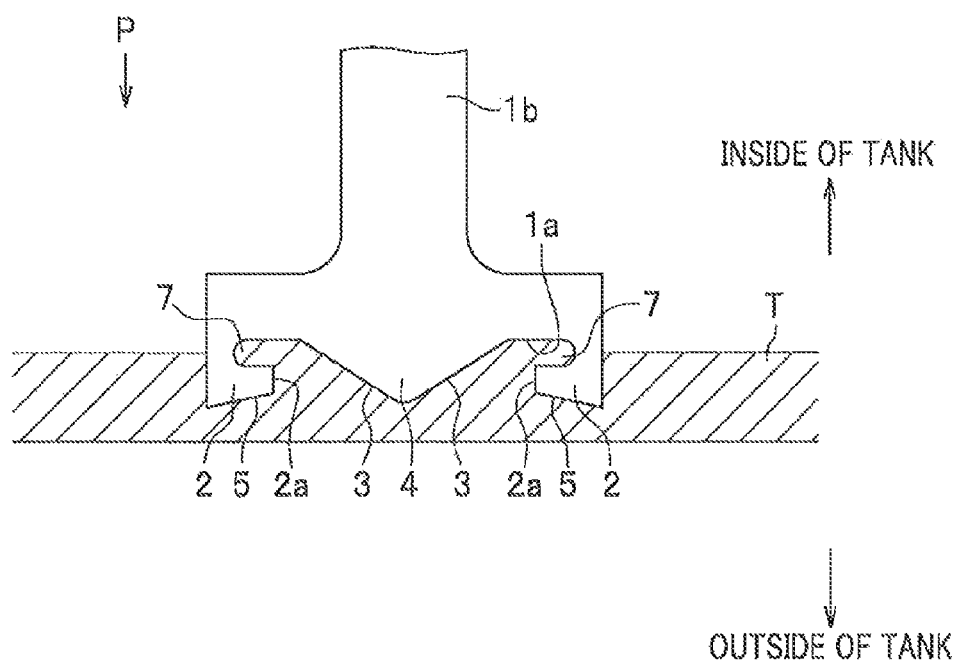
FIG. 1B is a diagram for explaining the hook portion according to the present invention, and is a side view showing the outline of the hook portion.

Reference numeral 1b in FIGS. 1A and 1B indicates a hook forming portion of a part 1 (see FIGS. 4 and 6) to be attached to a tank wall T of a resin-made fuel tank. An example of such a resin-made fuel tank is a tank for a vehicle, and examples of such a part 1 are tank-associated sub parts, such as a fuel-pump casing built in the tank and an attachment bracket of such a casing, and a casing for various valves built in the tank and an attachment bracket of such a casing. The shape of such a tank-associated sub part is not limited to any particular shape. The hook forming portion 1b is integrally molded with the part 1.

The part 1 is formed of a material like POM (polyacetal resin). In contrast, the tank wall T employs a multi-layer cross-section structure having a barrier layer formed of a material with a superior impermeability against fuel, e.g., EVOH (ethylene-vinyl-alcohol copolymer) sandwiched between, at least an inner thermoplastic resin layer forming a tank inner surface and an outer thermoplastic resin layer forming a tank outer surface. The inner thermoplastic resin layer and the outer thermoplastic resin layer are each formed of, for example, PE (high-density polyethylene) having good thermal melting characteristics and formability.

According to the present invention, the part 1 (the hook forming portion 1b) is formed with hook portions 2 each having a claw-like cross section, and the hook portions 2 are buried in the tank wall T, thereby fixing the part 1 to the tank wall T. The hook portions 2 are integrally molded with the hook forming portion 1b (i.e., the part 1).

FIGS. 1A and 1B show an embodiment in which a pair of hook portions 2 is integrally molded so that the hook tips 2a are opposed to each other at a distance. A chevron portion 4 having a pair of first inclined faces 3P is projectingly provided at a bottom face 1a (a surface facing the tank wall T) of the part 1 (the hook forming portion 1b) between the pair of hook portions 2. Also, a second inclined face 5 that is inclined in a direction opposite to a buried direction P toward the hook tip 2a is formed at a bottom face (a surface facing the tank wall T) of each hook portion 2.

With reference to FIGS. 2A to 2D, how to fix the part 1 will be explained. The resin-made fuel tank is formed by a blow molding die, and FIGS. 2A to 2D show a state in which a parison in a melted state is pasted on a die 6 by blowing as the tank wall T. The part 1 is attached to a non-illustrated support rod (e.g., the support rod 41 shown in FIG. 11 of JP 2009-132297 A) which is placed within the die 6.

Figure 2A:
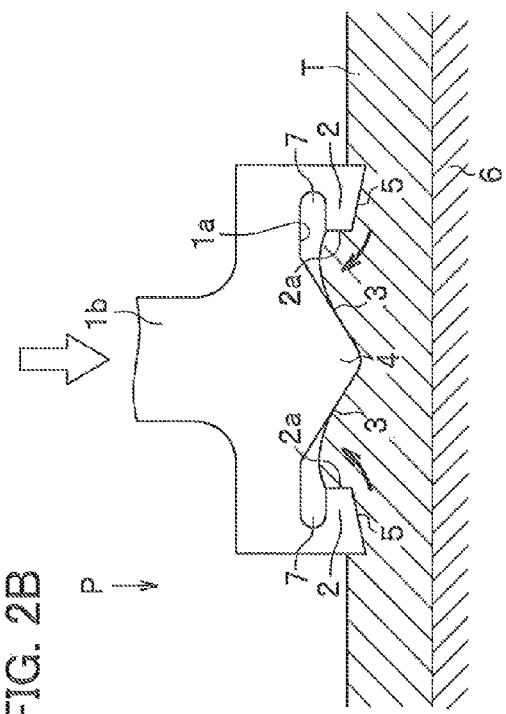
FIG. 2A is a diagram showing how the hook portion of the present invention is buried in a tank wall.
Figure 2B:
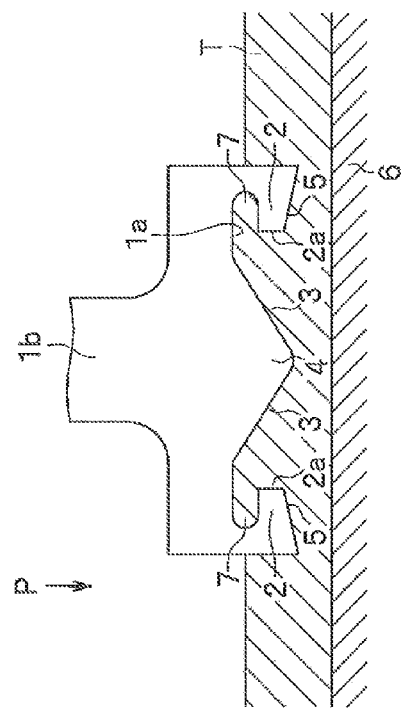
FIG. 2B is a diagram showing how the hook portion of the present invention is buried in the tank wall.
Figure 2C:
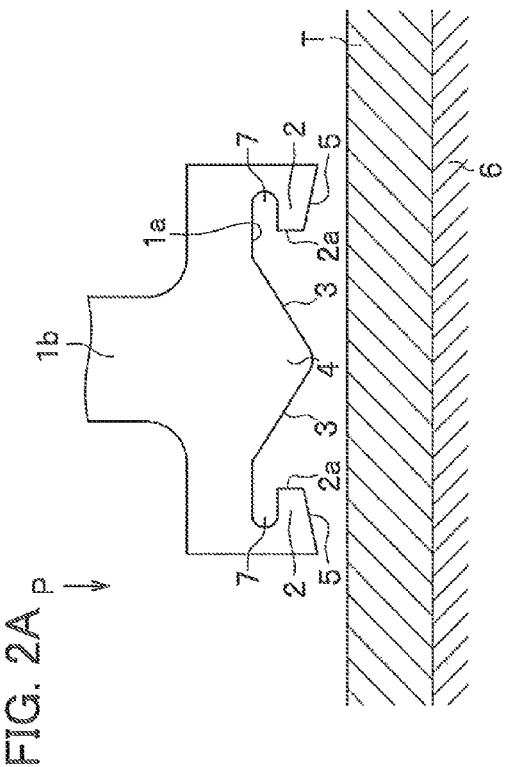
FIG. 2C is a diagram showing how the hook portion of the present invention is buried in the tank wall.

At the time of blow molding, at least either one of the die 6 or the support rod is moved in order to move the part 1 close to the tank wall T from the state shown in FIG. 2A, the melted resin of the tank wall T flows into a hooking internal space 7 surrounded by the bottom face 1a of the part 1 and the hook portions 2 in an order from FIG. 2B to FIG. 2C. In particular, the first inclined faces 3 of the chevron portion 4 formed at the bottom face 1a of the part 1, and the second inclined faces 5 formed at respective bottom faces of the hook portions 2 work together in order to function as a guide face which positively guides the melted resin into the hooking internal space 7, so that the resin smoothly flows into the hooking internal space 7 when the hook portions 2 are buried in the tank wall T.

Figure 2D:
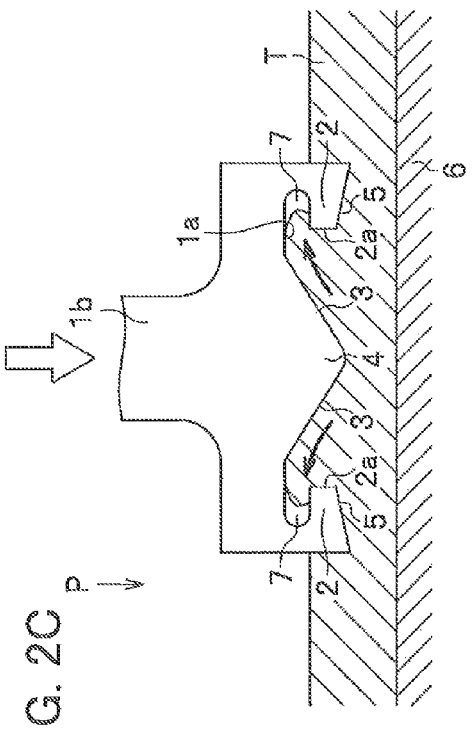
FIG. 2D is a diagram showing how the hook portion of the present invention is buried in the tank wall.

Next, when the hook portions 2 are buried and reach predetermined positions in the tank wall T, as shown in FIG. 2D, the hooking internal space 7 is completely filled with the melted resin of the tank wall T. Thereafter, when the die 6 is released and the whole fuel tank taken out from the die is cooled down, the resin of the tank wall T becomes solid, and because of the mechanical coupling force by the hook portions 2, the part 1 is firmly fixed to the tank wall T. According to JP 2008-507651 A, the thickness of the layer other than the rivet-like portion may become partially thin. In contrast, according to the present invention, because of a structure in which the hook portions 2 are pushed in the interior of the parison layer, a resin whose volume corresponds to that to be pushed out merely enters into the hooking internal space 7, no thin portion is substantially formed, and the layer structure of the parison layer is not substantially deteriorated.

Figure 3A:
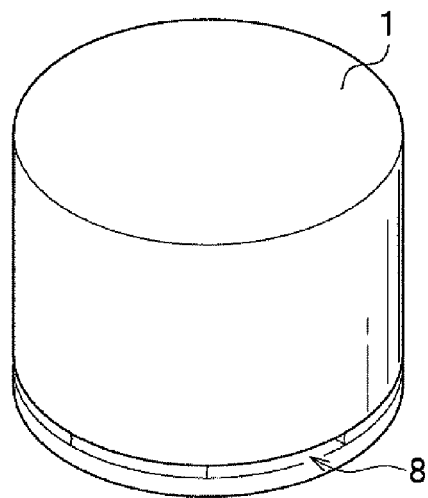
FIG. 3A is a diagram showing a first example layout of the hook portion, and is a perspective view showing an outline of the hook portion.
Figure 3B:
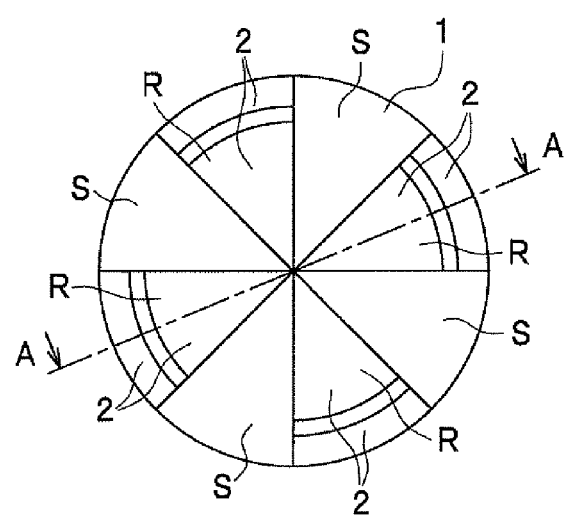
FIG. 3B is a diagram showing the first example layout of the hook portion, and is a bottom view showing the outline of the hook portion.
Figure 3C:
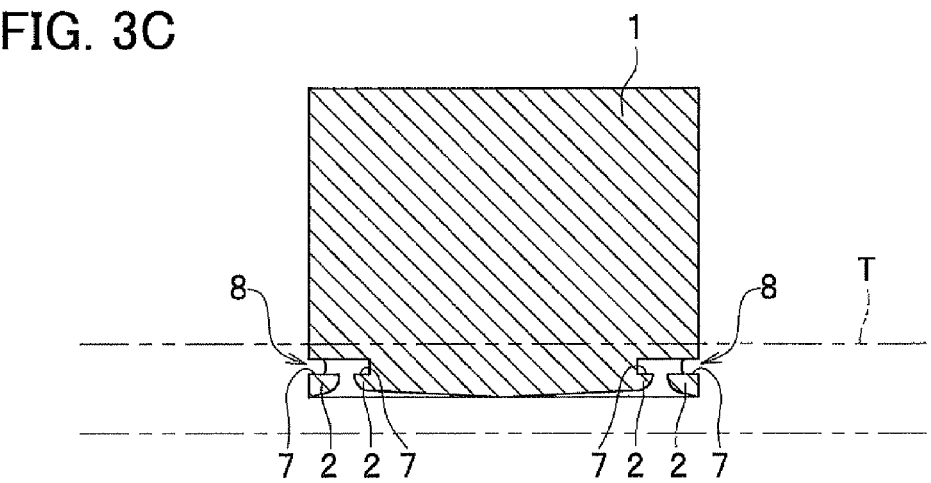
FIG. 3C is a diagram showing the first example layout of the hook portion, and is a side cross-sectional view showing the outline of the hook portion.

Hereinafter, a plurality of example layouts of the hook portion 2 to the part 1 formed in a substantially columned shape (or may be a circular cylindrical shape) will be explained. FIGS. 3A to 3C show a first example layout of the hook portion 2, and a plurality of (in the case of FIGS. 3A to 3C, four) regions R each having a pair of hook portions 2 are placed at a circular bottom face of the part 1 in a circumferential direction at equal intervals. The pair of hook portions 2 are formed along the circumferential direction of the part 1 at each region R. The other regions S are planes. As evidenced by FIG. 3C, the hooking internal space 7 of the hook portions 2 placed outwardly in the radial direction is communicated with an opening 8 on the outer circumference surface of the part 1. In this example layout, the second inclined face 5 of the hook portion 2 is formed in a curved surface.

Figure 4:
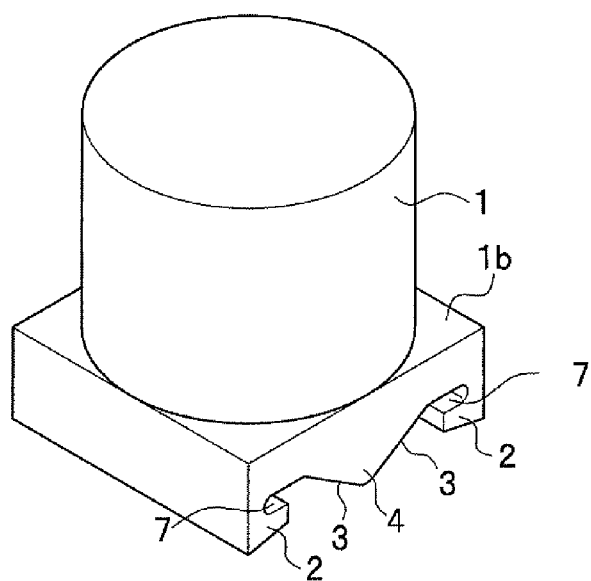
FIG. 4 is a perspective view showing a second example layout of the hook portion.

FIG. 4 shows a second example layout of the hook portion 2. The hook forming portion 1b is formed in the flat rectangular parallelepiped shape across the whole bottom face of the part 1, and each hook portion 2 (and the chevron portion 4) shown in FIGS. 1A and 1B has a linear cross section.

Figure 5A:
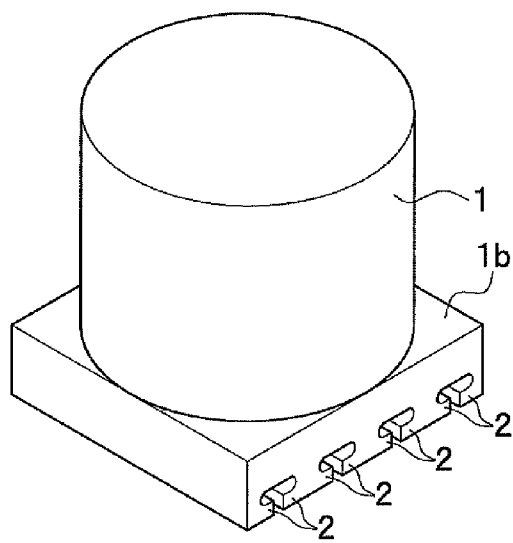
FIG. 5A is a diagram showing a third example layout of the hook portion, and is a perspective view showing an outline of the hook portion.
Figure 5B:
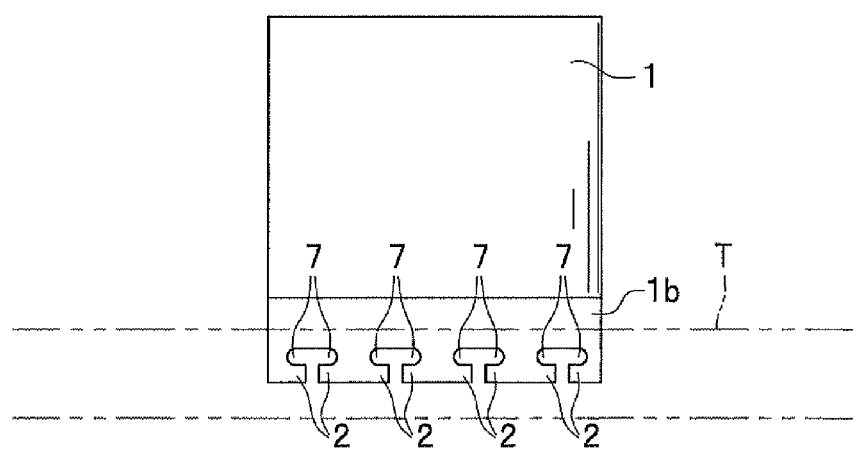
FIG. 5B is a diagram showing the third example layout of the hook portion, and is a side view showing the outline of the hook portion.

FIGS. 5A and 5B show a third example layout of the hook portion 2. The flat rectangular parallelepiped hook forming portion 1b is formed across the whole bottom face of the part 1, and a total of four pairs of hook portions 2 opposed to each other are provided, each of which has a linear constant cross section. In FIGS. 5A and 5B, it is shown that the hook portion 2 has no second inclined face 5 (see FIGS. 1A and 1B), but needless to say, the second inclined face 5 may be formed.

Figure 6:
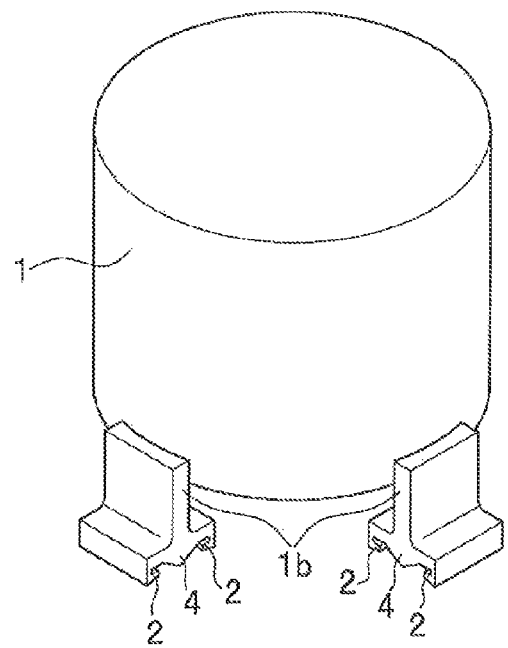
FIG. 6 is a perspective view showing a fourth example layout of the hook portion.

FIG. 6 shows a fourth example layout of the hook portion 2. A plurality of hook forming portions 1b are formed at the outer circumference of the bottom face of the part 1 in the circumferential direction at predetermined intervals. Each of the hook forming portions 1b has the pair of hook portions 2 shown in FIGS. 1A and 1B (and the chevron portion 4) having a linear cross section.

In the above-explained first to fourth example layouts, the part 1 can be firmly fixed to the tank wall T because of the mechanical coupling force obtained by the hook portions 2.

Figure 7:
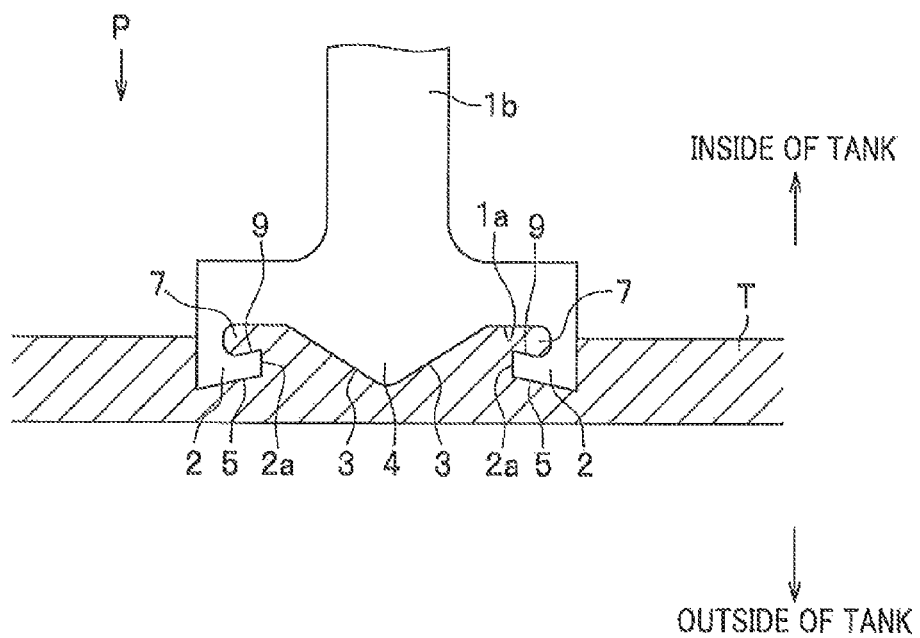
FIG. 7 is a side view showing a modified example of the hook portion.

In addition, if a third inclined face 9 which is inclined in the direction opposite to the buried direction P toward the hook tip 2a is further formed at the internal face of the hook portion 2 as shown in FIG. 7, the hook portion 2 is further engaged into the tank wall T, so that the pulling strength of the part 1 increases.

Although preferred embodiments of the present invention are explained above, the present invention is not limited to the disclosure by the accompanying drawings, and can be changed and modified in various forms within the scope and the spirit of the present invention. For example, depending on the shape of the part 1, a single hook portion 2 instead of the pair of hook portions 2 may be provided. Also, the part 1 may be attached to the outer surface of the tank wall T.

What is claimed is:

1. A part fixing structure that fixes a tank-associated part to an interior tank wall of a resin-made fuel tank, the part fixing structure comprising:
   first and second hook portions formed together with the tank-associated part, wherein the first and second hook portions which extend from a bottom face on the tank-associated part in a direction toward the interior tank wall, are opposed to and spaced apart from each other, include first and second tips directed toward each other, respectively, and have first and second spaces bordered by the first and second hook portions, the first and second tips and the bottom face on the tank-associated part, respectively; and
   a chevron portion projecting from the bottom surface on the tank-associated part in said direction and located between the first and second hook portions, the chevron portion having a pair of first inclined faces which are inclined relative to the bottom face on the tank-associated part, and extend toward the first and second spaces of the first and second hook portions, respectively,
   wherein the first and second tips of the first and second hook portions are directed toward the first inclined faces of the chevron portion, respectively,
   wherein each of the first and second hook portions has a second inclined face formed on a bottom face of each of the first and second hook portions and inclined upwardly toward the tip of each of the first and second hook portions,
   wherein the interior tank wall extends from one of the first inclined faces of the chevron portion to a first space of the first and second spaces surrounded by the first and second hook portions,
   wherein the interior tank wall extends from the other one of the first inclined faces of the chevron portion to a second space of the first and second spaces surrounded by the first and second hook portions, and
   wherein the first and second hook portions are buried in the interior tank wall to fix the tank-associated part to the tank wall.

2. A part fixing method for fixing a tank-associated part to a tank wall of a resin-made fuel tank, the tank-associated part being formed together with first and second hook portions and a chevron portion, wherein the first and second hook portions which extend from a bottom face on the tank-associated part are opposed to and spaced apart from each other, have first and second tips extending toward each other, respectively, and have first and second spaces surrounded by the first and second hook portions with the first and second tips and the bottom face, respectively, the chevron portion projecting from the bottom surface on the tank-associated part and located between the first and second hook portions, the chevron portion having a pair of first inclined faces which are inclined relative to the bottom face on the tank-associated part and extend toward the first and second spaces of the first and second hook portions, respectively, each of the first and second hook portions having a second inclined face formed on a bottom face of each of the first and second hook portions and inclined upwardly toward the tip of each of the first and second hook portions, the method comprising steps of:
   pressing the first and second hook portions and the chevron portion into the tank wall of a melted resin when the resin-made fuel tank is being molded;
   guiding the tank wall of the melted resin to the respective first and second spaces by the corresponding first inclined faces; and
   filling the tank wall of the melted resin into the first and second spaces when the resin-made fuel tank is being molded, thereby fixing the tank-associated part to the tank wall after the tank wall is cooled.

3. A tank-associated part to be fixed to an interior tank wall of a resin-made fuel tank, the tank-associated part comprising:
   first and second hook portions formed together with the tank-associated part, the first and second hook portions which extend from a bottom face on the tank-associated part in a direction towards the interior tank wall, are opposed to and spaced apart from each other, include first and second tips directed toward each other, respectively, and have first and second spaces bordered by the first and second hook portions, the first and second tips and the bottom face on the tank-associated part, respectively,
   a chevron portion projecting from the bottom surface on the tank-associated part in said direction and located between the first and second hook portions, the chevron portion having a pair of first inclined faces which are inclined relative to the bottom face on the tank-associated part and extend toward the first and second spaces of the first and second hook portions, respectively,
   wherein the first and second tips of the first and second hook portions are directed toward the first inclined faces of the chevron portion, respectively,
   wherein each of the first and second hook portions has a second inclined face formed on a bottom face of each first and second hook portion and inclined upwardly toward the tip of each first and second hook portions, and
   wherein when the first and second hook portions and the chevron portion are pressed into the interior tank wall of a melted resin on the resin-made fuel tank being molded, the corresponding first inclined faces guide the melted resin of the interior tank wall to the respective first and second spaces, thereby fixing the tank-associated part to the interior tank wall.

* * * * *